PHOTO-ELECTRICAL COMPANDOR

Filed April 11, 1962 3 Sheets-Sheet 1

INVENTOR.
NICHOLAS KOVALEVSKI
DAVID C. WILTON

BY [signature]

ATTORNEY

Oct. 19, 1965 N. KOVALEVSKI ETAL 3,213,391

PHOTO-ELECTRICAL COMPANDOR

Filed April 11, 1962 3 Sheets-Sheet 2

PHOTO-ELECTRICAL COMPANDOR

Filed April 11, 1962

United States Patent Office 3,213,391

Patented Oct. 19, 1965

3,213,391

PHOTO-ELECTRICAL COMPANDOR

Nicholas Kovalevski, Palo Alto, and David C. Wilton, Sunnyvale, Calif., assignors to International Telephone & Telegraph Corporation, New York, N.Y., a corporation of Maryland Filed Apr. 11, 1962, Ser. No. 186,735
17 Claims. (Cl. 333—14)

This invention relates to compandors, and more particularly to variable loss controllers for compandors.

Compandors improve the signal-to-noise ratio of transmission circuits, particularly voice transmission circuits used in long distance telephony. The improvement results from interaction of "compressor" and "expandor" circuits acting upon the volume range or dynamic swing of voice signals. That is, the compressors reduce the volume range of input signals introduced into transmission paths and the expandors restore the original volume range to output signals extracted from these transmission paths. The characteristic noise of these transmission paths occurs in the volume range eleminated by the compressors. Thus, the signals and noises do not overlap in the transmission paths. Therefore, the noise does not appear in the restored volume range of the output signal.

Obviously, the expandors must restore to the output signals exactly the same characteristics that the compressors remove from the input signals. In the past, the required sorting and selecting components that are matched within close tolerance limits. It also required the use of relatively high grade components which remain stable despite aging and widely fluctuating ambient environmental conditions. Otherwise the characteristics of the matched components might drift apart with age. Moreover, the variable loss controllers, (known as variolossers), used heretofore in compandor circuits have included resistance pads controlled by diodes. The resistance values of the pads are varied as a function of the direct current flowing through the diode, and the direct current is obtained by rectifying a portion of the compandor amplifier signal. This arrangement necessitates use of a filter to cause the direct current to vary in accordance with the syllabic envelope of speech. The result is that compandors are relatively expensive as compared with similar devices.

Accordingly, an object of the invention is to provide new and improved compandors. A companion object is to provide a control over compressor and expandor circuits which eliminates the need for rectifying and filtering the feedback to the variolosser, and obviates the necessity for sorting to match components. Moreover, an object is to eliminate the need for expensive high-grade components.

Another object is to provide a multiple output control device for giving two closely matched demodulated output control signals responsive to a modulated common input signal. In this connection, an object is to provide a single device for detecting voice signals and for providing an output envelope signal at either of two output terminals. The output signal follows the syllabic repetition rate of the original voice signals. Also, an object is to provide an output envelope signal having a true fidelity response from zero cycles per second up to a pre-selected threshold value, but not to provide an envelope response above that threshold value.

Finally, an object is to provide an inexpensive, easily manufactured control device made by a minimum number of tools, jigs, or dies on general purpose machines. Here, an object is to provide low cost general purpose control device having plug-in construction to allow low cost installation, maintenance and repair of controlled circuits.

In accordance with one aspect of this invention, a control device utilizes photo-electric cells to provide many output signals, each of which vary as a function of controlled condition variations. The control devices include a common light source positioned to shine through apertures in each of a plurality of reflector plates. The reflector plates are constructed so that each directs a light beam of the same illuminating intensity. The illumination intensity of the common light source is modulated according to the condition variations; therefore, the light beams directed by the reflector plates are also modulated. Photo-electric cells response to these light beam modulations to give output signals which also vary as a function of the controlled condition variations.

In accordance with another aspect of this invention, the photoelectric control device is used as a variable-loss device for independently controlling the signal volume of compressor and expandor circuits. The illumination intensity of the common lamp is controlled by the volume of signals in the compressor and expandor circuits. Since this lamp is a common source and the reflector plates direct beams of equal light intensity, the outputs from the photo-electric cells are equal and may be used to independently control the volume of amplifiers in the compressor and expandor circuits. Thus, the effects on the compressor and expandor circuits are substantially identical.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
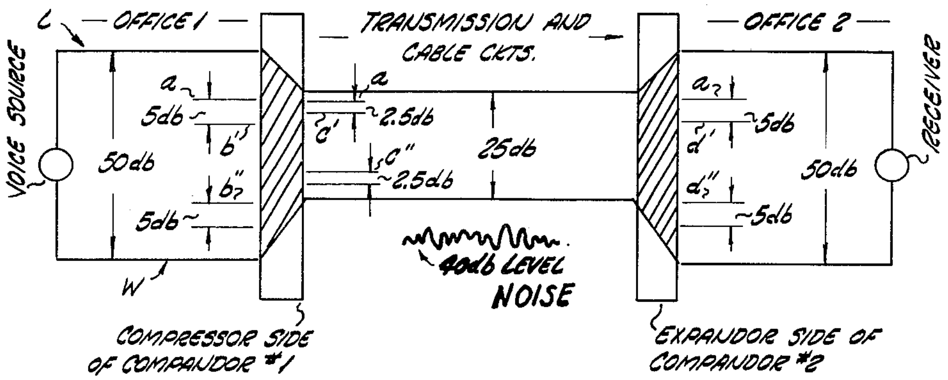
FIG. 1 is a diagram, representing signal volume swing vertically and distance horizontally, for explaining how a compandor operates.

FIG. 1 shows exemplary volume range characteristics of speech transmitted in one direction through two compandor circuits. Another diagram could be drawn parallel to that shown in FIG. 1. This other diagram would be identical to that shown in FIG. 1, except that the voice source would be at the right and the receiver at the left. This other diagram would then indicate the transmisison characteristics of a channel for transmitting voice signals in a direction opposite to that shown in FIG. 1. Both the channel shown and the reverse direction channel would pass through the same compandors #1 and #2.

As here shown, a voice source provides speech signals having volume variations which swing over a range of approximately 50 db. That is, the loudest transmittable voice signals are represented at L, and the weakest transmittable signals are represented 50 db lower at W. Inside the offices, the entire 50 db range of the speech signal volume variations can be transmitted with no difficulty. However, if these same signals are transmitted to a distant office, there must be amplification to overcome line, cable, or other transmission loss. If the amplification of the system is adjusted to compensate for line loss at level L, the weak level signals W do not reach the distant office. On the other hand, if the amplification of the system is adjusted to compensate for line loss at level W, the loud level signals over drive the amplifier and distorted signals reach the distant office.

If automatic gain control alone is used to solve the distortion problem, a low signal to noise ratio problem persists, since the noise and low level signal are both amplified. The reasons for the noise of the transmision media is not important to this invention. The important point is that this transmission noise characteristically occurs below the 40 db level. Therefore, the desired voice signal volume variations should swing over a range that ends well above the 40 db point. This way, signals and noise do not overlap in the transmission medium and the signal may be separated from the noise in the distant office, thus giving a high signal-to-noise ratio.

The compandor operates this way. All signals having a reference volume level (arbitrarily shown at *a* in FIG. 1) are transmitted without change from Office 1 over Transmission and Cable circuits to Office 2. All signal volume swings above or below this reference level are compressed or changed toward the reference level in a Compressor circuit which is one-half of Compandor #1. These compression changes are conventionally made in a ratio of approximately 2:1. Thus, the Compressor circuit in the local or transmitting office changes incremental 5 db swings at *b' b''*, for example, into corresponding incremental 2.5 db swings back into incremental 5 db swings at *d' d''*. Of course, the points *b*, *c*, and *d* are arbitrarily chosen to explain the operation. The effect is continuous over the entire volume range as indicated in FIG. 1 by cross-hatching. Since the noise in the transmission and cable circuits is 40 db down from reference level *a*, the signal and noise do not overlap with the transmitted 25 db signal. Thus, the noise does not appear in the reconstituted or expanded Office 2 signal.

As should be apparent to those skilled in the art, circuits, other than compandors, may require unequal control response. For example, some industrial control systems may provide a plurality of circuits for adjusting upper and lower tolerance limits. Thus, if a production tolerance swing of +10%−2% is desired, a large effect change may be desired on the upper limit or +10% side and a small effect change may be desired on the lower limit or −2% side. The point is, that a common control device may find many uses similar, but not identical, to those illustrated by FIG. 1.

Figure 2:
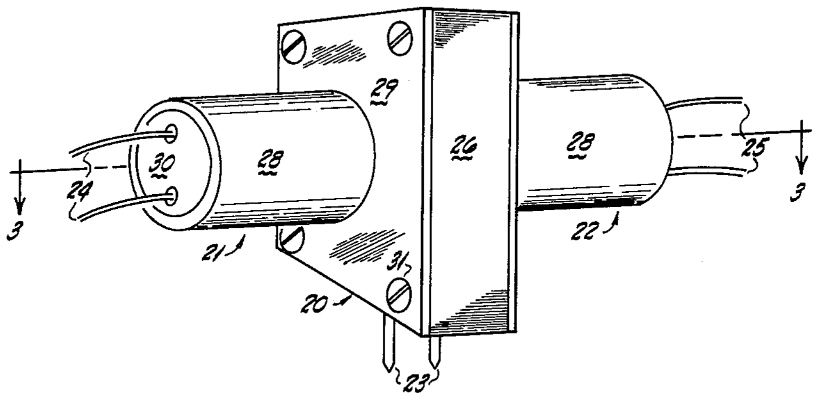
FIG. 2 is a perspective view of a multiple output photo-electric control device.

In carrying out this invention, the photo-electrical control device of FIG. 2 provides identical and opposite effects in the compressor and expandor circuits at one transmission terminal. It may be well to recall that FIG. 1 shows two terminals that give one-way transmission. To provide a return path, the diagram of FIG. 1 is duplicated in reverse order, as explained above. Thus, an expandor (not shown) is associated with the compressor shown in Office 1. A compressor (not shown) is associated with the expandor shown in Office 2. One photo-electric device in Office 1 controls the compressor and expandor circuits in Office 1; another photo-electric device controls the circuits in Office 2.

The control device is shown in FIG. 2 as including a central light chamber 20 having a pair of axially aligned chambers 21, 22 radially extending therefrom. The input signals are applied at a plug base 23 and two output signals are taken from output conductors 24, 25. Two chambers 21, 22 are shown because two output signals are required. If more output signals are required, more radial chambers are provided.

While these chambers may be constructed in any convenient manner, the invention contemplates use of three molded plastic piece parts. One piece part is a rectangular frame 26. Another piece part is a cylinder 28 mounted on a rectangular base plate 29. The base plate is shaped and dimensioned to enclose one end of the frame 26. The third piece part is a threaded cover 30 which may be turned into matching threaded openings at the outer ends of the cylinders 21, 22 and at the bottom of the frame 26. Output conductors 24, 25 pass through openings in the covers at the ends of the cylinders and the plug base prongs 23 pass through the cover at the bottom of the frame.

An advantage of this construction is that the control device chamber is assembled from a minimum number of inexpensive piece parts made by general purpose machines. After assembly, the frame and base plates are bolted together as indicated at 31, for example. Finally, components are mounted on the three covers 30 which are turned into position. This construction makes a low cost plug-in control device, which in turn, allows low cost installation, maintenance and repairs.

Figures 3, 4:
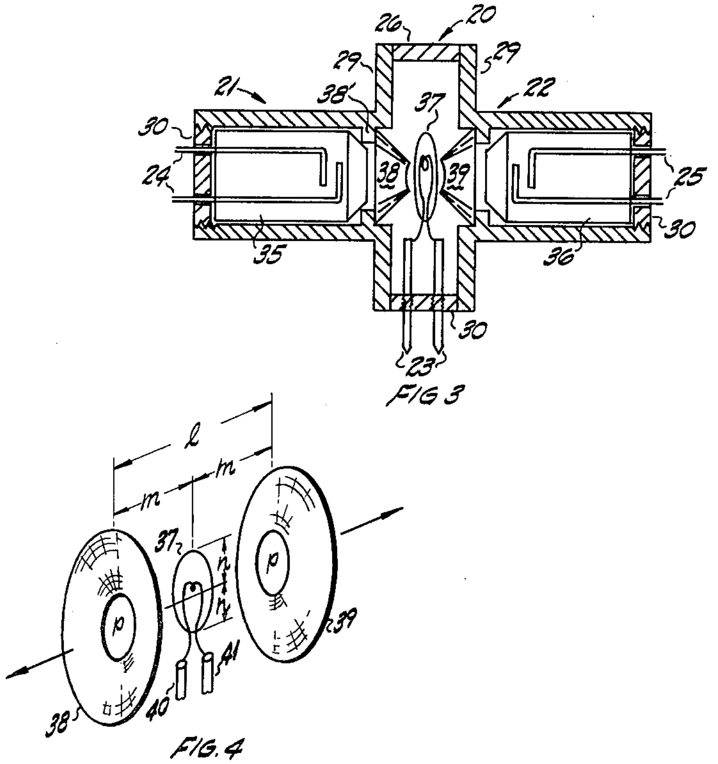
FIG. 3 is a cross-sectional view of the control device which would be seen if device of FIG. 2 is cut along line 3—3 of FIG. 2.
FIG. 4 is an enlarged perspective view of the common light source and reflector plates.

The components inside the control device chambers are visible in FIG. 3. These components include a pair of photo-electric cells 35, 36, a lamp 37, and a pair of apertured reflector plates 38, 39. In one exemplary construction, the photo-electric cells are "Clairex Type 604L" and the light bulb is "Sylvania Type ML 202*a*."

The internal dimensions of the cylinders 28 are selected to receive and support the photo-electric cells when the cells are inserted into the cylinder bore and pushed to rest upon an internal shoulder 38'. Thereafter, the cover 30 is turned into the opening to hold the photo-electric cell in place.

By inspection of FIG. 3, it is seen that the chambers formed by the two radially extending cylinders 28, 28 communicate with the central light chamber enclosed by the frame 26 and the base plates 29, 29. Therefore, the centrally located lamp 37 shines upon the ends of both photo-electric cells. Since the same light shines upon both cells, each reacts in substantially the same way, assuming that the cells have similar characteristics.

To direct and concentrate the light falling upon the photo-electric cells, the pair of apertured reflector plates 38, 39 are positioned between the lamp and the cells. The periphery of plates 38, 39 preferably conform to the shape and dimension of the internal bore of the cylinders 28, 28. Thus, the reflector plates are fitted against the chamber 20 side of shoulder 38' before the base plate 29 is bolted to frame 26. The plates may be held in place by any suitable means such as glue, tape, C washers, or friction.

The relation between the lamp 37 and reflector plates 38, 39 is explained by FIG. 4. The lamp is supported by having its filament welded to the plug base prongs at 40, 41. The reflector plates are separated by a distance *l*, and the lamp is midway between, as indicated at *m, m*. Both horizontally and vertically (as indicated at *n, n*,) the lamp is centered (with respect to its light) between the apertures *p, p*.

Those skilled in the art are expected to select the surface and configuration for the reflector plates. As a generality however, the reflector shape will be part of a paraboloid. The reflecting surfaces should be as nearly matched as possible. However, the reflectors do not have to have a mirror finish.

Figure 5:
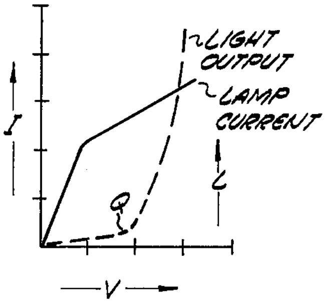
FIG. 5 shows the characteristic curves of the common light source with current and lumens plotted vertically, and voltage plotted horizontally.

The characteristics of the lamp bulb 37 are shown in FIG. 5. The solid line curve shows lamp current plotted with current on the vertical axis, and voltage on the horizontal axis. The dashed line curve shows light output resulting from the lamp current of the solid line plot. The vertical axis for the dashed line curve is millilumens.

These lamps have an extremely low thermal inertia. Thus, the light output follows voltage impulses up to about 100 pulses per second. At higher frequencies, the light beam continues to be modulated, but to a progessively lesser degree. This characteristic frequency response closely matches the needs of a compandor which must follow the syllabic rate of speech. (The syllabic rate is typically to 100 cycles per second.)

Figure 6:
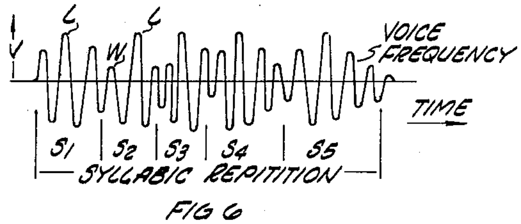
FIG. 6 shows a voice frequency wave form with voltage plotted vertically and time plotted horizontally, to explain how the lamp follows a syllabic repetition rate but not a voice frequency of voice signals.

More particularly, FIG. 6 shows a voice current wave form of a type that might be transmitted over the system of FIG. 1. The relatively high voice frequency must not be disturbed by the compandor or there will be speech distortion. On the other hand, each syllable S1, S2 . . . S5 includes loud signals L and weak signals W. The volume of the loud signals L must be reduced much more than the volume of the weak signals W if the 50 db swing is to be compressed to 25 db. Thus, the compandor must follow the syllabic repetition rate and not the voice frequency. This automatically occurs due to the thermal inertia of the lamp filament. That is, the 200–3000 cycle per second voice frequency signal transmitted over telephone circuits changes too fast to produce any change in the level of illumination. But the level of illumination follows the syllabic envelope.

Figures 7, 8:
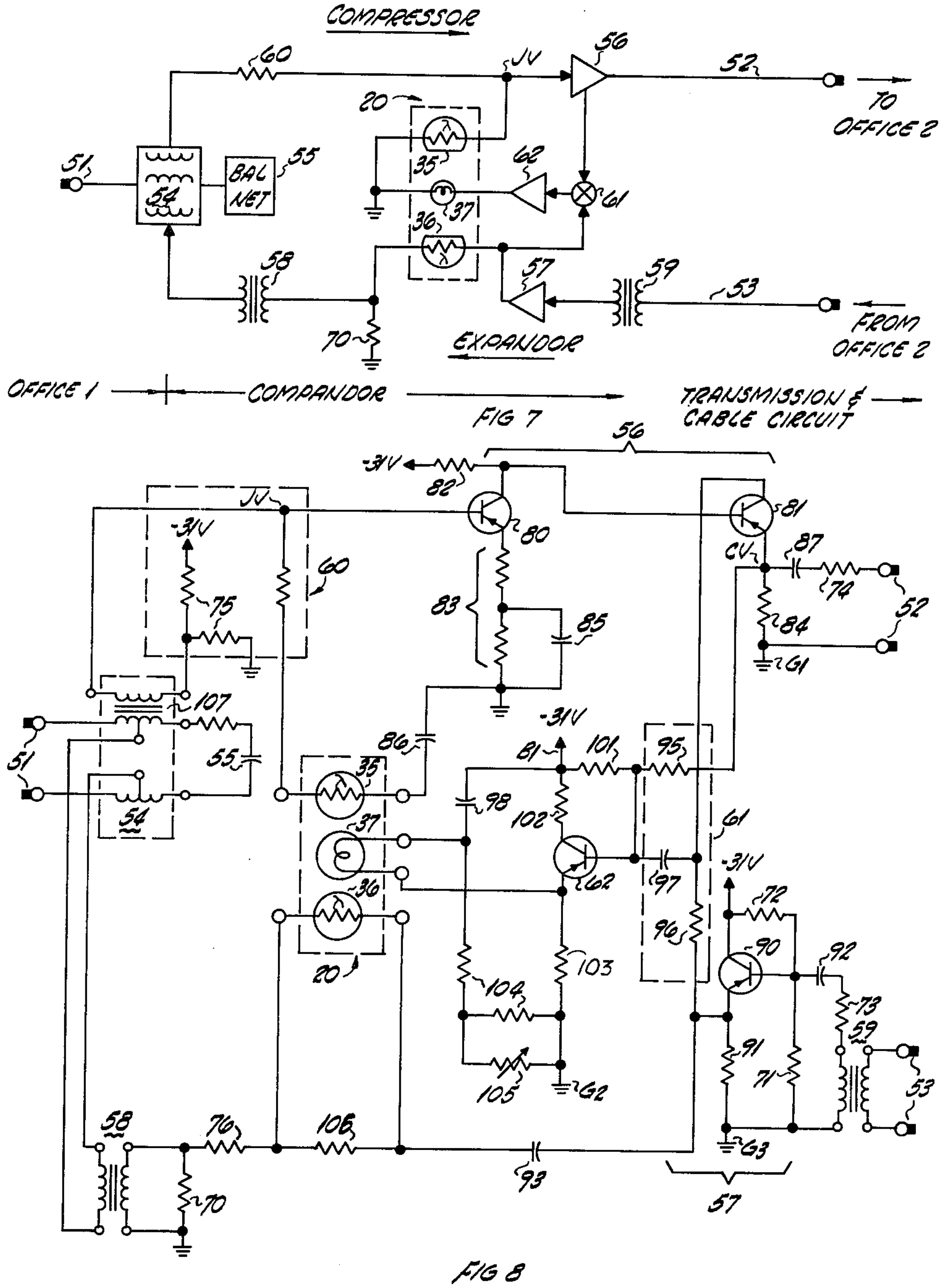
FIG. 7 is a block diagram showing how the photo-electric device of FIG. 2 is used in a compandor.
FIG. 8 is a schematic circuit diagram for the block diagram of FIG. 7.

The manner of accomplishing this is shown in the block diagram of FIG. 7. The Office 1 circuit includes a two wire line 51 which transmits signals having a 50 db swing. The Transmission and Cable Circuit includes a four wire line 52, 53 which transmits and receives signals having a 25 db swing. A hybrid coil 54 with balancing network 55 connects the two wire line to the four wire line. A transmitting amplifier 56 amplifies all signals outgoing from Office 1 through a transmit channel to Office 2, and a receive amplifier 57 amplifies all signals received from Office 2. The receive amplifier 57 is transformer coupled in to the receive channel at 58, 59. The output of amplifier 56 is fed back through the photoelectric control device 20 to cause compression. The output of amplifier 57 is fed forward through the photo-electric device 20 to cause expansion.

That is, when the lamp is biased to the "Q" point of FIG. 5, the resistance of the photo-electric cells 35, 36 changes linearly with the change in light falling on them. Thus, resistor 60 and photo-electric cell 20 form a variable resistance voltage divider. If the speech becomes louder, the output of amplifier 56 starts to go up. A signal is fed back through a summing junction 61 and lamp amplifier 62 to the filament of bulb 37. The light brightens and the resistance of photo-electric cell 35 goes down. Thus, the voltage divider junction voltage JV goes down because there is a greater drop across resistor 60. This reduces the input signal strength to amplifier 56 and thus the volume on line 52. The converse is true when the speech on line 52 becomes weaker.

On the expandor side, a loud signal on line 53 increases the output of amplifier 57. This increase feeds forward through summing junction 61 and lamp amplifier 62 to brighten lamp 37. The resistance of photo-electric cell 36 goes down, and there is a greater voltage increase across load resistor 70 and consequently at coil 58. Thus, the increased signal from amplifier 57 is further increased. The converse is true here also. Reduction in the amplifier 57 output darkens the lamp and increases the resistance of photo-electric cell 36. Thus, the reduced amplifier output is further attenuated because there is a greater voltage decrease at coil 58.

Therefore, upon reflection, it is seen that a relatively great volume swing at 51 produces a compressed volume swing at 52. And, a relatively small volume swing at 53 produces an expanded volume swing at 51. The detailed circuit for producing this result is shown in FIG. 8. To orient the reader, the reference numbers of FIG. 7 also appear in FIG. 8.

In FIG. 8, the hybrid coil, balancing network 54, 55 and the repeat coils 58, 59 are conventional. The compandor input and output impedances are fixed by resistors 70–75, and by balancing network 55. Additionally, resistors 75 provide base bias and swamp variations in the compressor circuit input impedance while resistor 76 swamps variation in the expandor output impedance.

The compressor amplifier 56 includes a pair of PNP junction type devices 80, 81. Resistor 82 is a collector load and resistors 83, 84 are emitter bias resistors. An A.C. bypass capacitor 85, connected around part of the resistor 83, provides a controlled amount A.C. and D.C. degeneration or negative feedback for stabilizing the transistor 80. The base bias for transistor 80 is obtained from a voltage divider including the resistors 75. Capacitors 86, 87 are A.C. coupling and D.C. blocking.

The expandor amplifier 57 includes a PNP junction type device 90 with a base bias voltage divider 71, 72 and an emitter load 91. Capacitors 92, 93 are A.C. coupling and D.C. blocking.

The summing junction 61, includes a pair of resistors 95, 96, 101, connected between the outputs of amplifiers 56, 57 and the input of lamp amplifier 62, which also is a PNP junction type device. This junction provides a minimum of 30 db isolation between lines 52, 53.

The lamp amplifier 62 includes the PNP device with an input A.C. coupled at 97 to junction 61 and an output A.C. coupled at 98 to lamp 37. Base bias is taken from a voltage divider including resistors 101, 95 and 84. The resistor 102 limits surges in the current through the emitter-collector circuit of transistor 62. Resistors 104 provide lamp bias current. A fine adjustment potentiometer 105 adjusts this lamp bias to provide quiescent operation at point Q of FIG. 5. From the "Q" point, the light output increases almost linearly with increased lamp current.

Finally, the compandor circuit of FIG. 8 including a resistor 106 selected to give a minimum low level expandor gain regardless of the resistance of photo cell 36.

The operation of the FIG. 8 circuit should be apparent from the above description of FIG. 7. Briefly, in resume, the signals on line 51 are induced across hybrid windings 107. This changes the voltage divider potential at JV and therefore, the base voltage at transistor device 80. Current flowing through transistor device 80 to the base of transistor device 81 is, therefore, an amplified replica of the signal on line 51. The transistor device 81, in turn, amplifies the signal and therefore, changes the potential at control voltage point CV.

On compression, the lamp amplifier is driven by the voltage applied to its base via the voltage divider resistors 84, 95, 101 connected between battery B1 and ground G1. As the voltage at point CV goes up and down, the voltage on the base of transistor 62 also goes up and down. Thus, the variations of the signal on line 51 appear in the current flow from battery B1 through resistor 102, transistor 62, the filament of lamp 37 and resistors 104, 105 to ground G2. When a signal volume (voltage) on line 51 goes up, lamp 37 brightens, when it goes down, lamp 37 dims. When the lamp brightens, the resistance of cell 35 goes down and junction voltage JV decreases, thus reducing the volume of the signal on line 52. When the lamp dims, the resistance of cell 35 goes up and junction voltage JV increases, thus tending to prevent reduction of the volume on line 52.

Signals on line 53 are applied through repeat coil 59, resistor 73, and capacitor 92 to the base of transistor device 90. An amplified replica of this signal controls the potential across voltage divided 101, 97, 96 and 91 connected between battery B1 and ground G3. Hence, the current through transistor 62, and therefore through the filament of lamp 37, also changes as a function of the signal voltage on line 53. As the line 53 signal voltage goes up, lamp 37 brightens and the resistance of cell 36 goes down. As the line 53 signal voltage goes down, the lamp dims and the resistance of cell 36 goes up. Thus, the signal voltage variations appearing on line 53 are expanded before being applied through repeat coil 58 and hybrid coil 54 to line 51.

Figure 9:
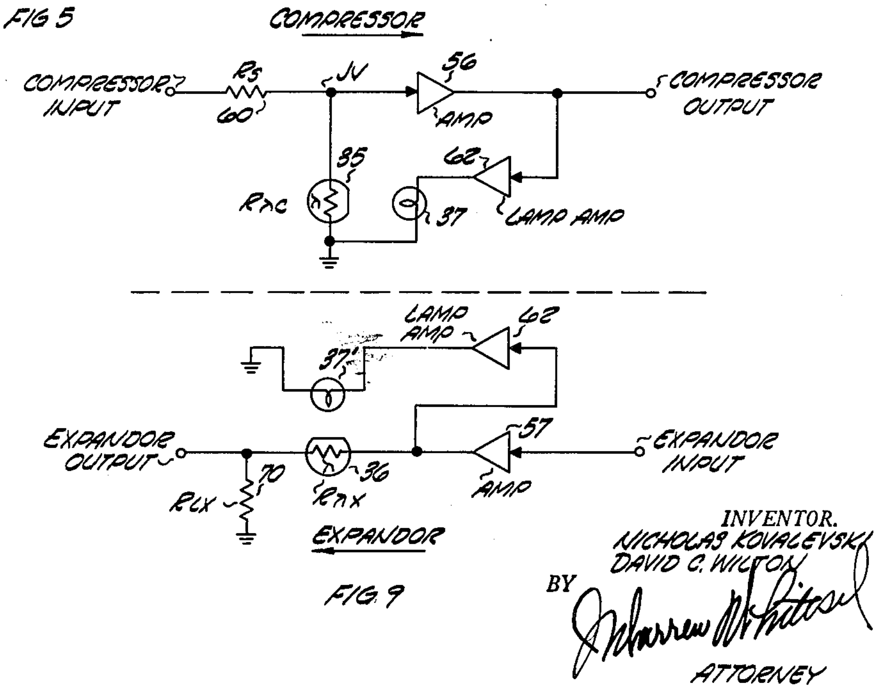
FIG. 9 shows a block diagram which is an alternative embodiment of the invention shown in FIG. 8.

Another embodiment of the invention is shown in the block diagram, FIG. 9. There, the compressor and expandor circuits have been seperated to provide two isolated, one-way transmission channels. The same reference numerals identify the same parts in FIGS. 7–9. Therefore, it is thought that the operation of FIG. 9 circuit will be apparent from the foregoing description.

The difference between the embodiments of FIGS. 7 and 9 will be readily apparent from a side-by-side comparison of the two drawings. FIG. 7 shows a telephone transmission circuit for joining a two-way, two wire or communication channel circuit 51 with two, one-way, two wire communication channels or circuits 52, 53. One side of the hybrid network 54 connects to the two-way circuit 51 and the other side of the hybrid network connects to the two one-way circuits 52, 53. The transmit amplifier 56 is interposed between the hybrid network and the transmit terminals marked To Office 2. The receive amplifier 57 is interposed between the hybrid network 54 and the receive terminals marked From Office 2. Thus, the photocontrol device 20 is common to the two channels. In this manner, the output of the transmit amplifier 56 is fed back through junction 61 and amplifier 62 to control the light intensity while the input to the receive amplifier 57 is fed forward through junction 61 and amplifier 62 to control the light intensity. Therefore, one common control device provides both compression and expansion.

Contrast this with the isolated control over two separate communication channels as shown in FIG. 9. Here, the upper or Compressor channel is completely isolated from the lower or Expandor channel. Thus, two completely separate photo-controllers 37, 35, and 37', 36, are used. However, from this point on, the function of the two embodiments is similar. Thus, signals transmitted through the transmit terminals, marked Compressor Output, in the upper channel are fed back through amplifier 62 and lamp 37 to cause compression, and signals transmitted through the receive terminals, marked Expandor Input, are fed forward through amplifier 62 and lamp 37' to cause expansion.

Upon reflection, it will be seen that the invention has provided not only a new and improved compandor, but also low cost multiple output control device. The result is an improved compandor which does not require a sorting of components to provide expensive, high grade, close tolerance components. Moreover, the characteristics of the photo-control device allow response up to the syllabic repetition rate, but precludes response at the higher frequencies. Thus, response is limited to voltage variations occurring at lower than a threshold level.

It is to be understood that the foregoing description of a specific example of the invention is not to be considered as a limitation on its scope.

We claim:

1. A multiple output photo-electric control device for providing output signals which vary as a function of condition variations, said device comprising a central light chamber having a plurality of communicating chambers extending radially therefrom, each of said radial chambers providing a cavity for receiving and supporting a photo-electric cell, a common light source in said central chamber, means comprising a plurality of apertured reflector plates for deflecting equal amounts of light from said source into each of said radial chambers and onto the photo sensitive elements of said photo-electric cells, and means for modulating the illumination intensity of said light source responsive to said condition variations.

2. A multiple output photo-electric control device for providing output signals which vary as a function of condition variations, said device comprising a central light chamber having a plurality of communicating chambers extending therefrom for receiving and supporting photoelectric cells, a common light source in said central chamber, means positioned at the communicating point between said central chamber and said extending chambers for deflecting equal amounts of light from said source into each of said extending chambers and onto the photo sensitive elements of said photo-electric cells, and means for varying the illumination intensity of said light source responsive to said condition variations.

3. A multiple output photo-electric control device for providing output signals which vary as a function of input signals, a central light chamber having a plurality of chambers extending therefrom, each of said extending chambers providing means for receiving and supporting a photo-electric cell, a common light source in said central chamber, circuit means for varying the intensity of illumination from said source as a function of said input signals, means for deflecting equal amounts of light from said source onto the photo sensitive elements of each of said photo-electric cells, and output circuit means for responding to the illumination resistance of said photo-electric cells.

4. A multiple output photo-electric control device for providing output signals which vary as a function of the syllabic repetition rate of voice signals, said device comprising a central light chamber having a plurality of chambers extending therefrom, each of said extending chambers being shaped to receive and support a photo-electric cell, a common light source in said central chamber, said common light source including a filament having a thermal inertia which causes said lamp to follow said syllabic repetition rate, but not the voice frequencies transmitted through telephone systems, means for deflecting equal amounts of light from said source onto the photo sensitive elements of said photo-electric cells, and means for applying said voice signals to said filament for modulating the illumination intensity of said light source responsive to the variations of the syllabic variations of said voice signals.

5. The device of claim 4 and circuit means for compressing and expanding the volume range of said voice signals, means including a first of said photo-electric cells for feeding back a signal to control said compressing means, and means for feeding forward a signal to control said expanding means.

6. A signal characteristic changing circuit comprising a plurality of circuits having opposing effects upon said signal, means comprising a device for independently controlling each of the circuits, said device comprising a plurality of photo-electric cells illuminated from a single light source, means for applying the light from said source to said cells in beams of substantially equal illuminating intensity, there being as many beams as there are photo-electric cells, means for modulating the intensity of the light falling on said cells in accordance with the variations of signals in said circuits, and means responsive to the output of said photo-electric cells for providing said opposing effects.

7. A compander comprising a compressor and an expandor circuit, each including an amplifier circuit for providing a volume control circuit, means including a variable loss device for independently controlling the volume control of each of said amplifier circuits, said variable loss device comprising a plurality of photo-electric cells, a source of light, means for directing light from said source on to said cells via light beams of substantially equal illuminating intensity, there being as many beams as there are photo-electric cells, means for modulating the intensity of the light from said source in accordance with the volume of signals in said compressor and expandor circuits, and means responsive to the outputs of said photo-electric cells for controlling said volume control circuit.

8. A telephone transmission circuit for joining a two-wire circuit and a four-wire circuit, said transmission circuit including a compandor comprising a compressor and an expandor circuit, each including an amplifier circuit having a volume control circuit, a variable loss device for independently controlling each of the volume control circuits, said variable loss device comprising a pair of photo-electric cells illuminated from a common light source, means for dividing the light from said source into two beams of equal illuminating intensity, means for modulating the intensity of the light from said source in accordance with the volume of signals in said compressor and expandor circuits, voltage divider means having one of said photo-electric cells in one arm thereof for controlling said volume control circuit in the compressor amplifier circuit, and means including the other of said photo-electric cells for feeding forward an output signal from said expandor amplifier thereby controlling the volume of the expandor amplifier.

9. A telephone transmission circuit for joining a two-wire line and a four-wire line comprising a hybrid network having one side connected to said two wires and the other side connected to said four wire side, means including a compressor circuit having an amplifier interposed between said hybrid network and two of said four wires, a variable loss device for controlling the volume of said amplifier circuit, said variable loss device comprising a plurality of photo-electric cells illuminated from a common light source, means comprising one of said cells for varying the volume of input signals to said amplifier, and means for modulating the intensity of the light from said source in accordance with the volume output signals from said compressor circuit.

10. The transmission circuit of claim 9 and means including an expandor circuit having an amplifier interposed between the other two of said four wires and said hybrid network, and means comprising another of said cells for varying the volume of output signals from said expandor amplifier.

11. The transmission circuit of claim 10 and means for modulating the intensity of the light from said source in accordance with the volume of input signals to said expandor circuit.

12. A compandor circuit comprising transmitting terminals and receiving terminals, control means for controlling the volume of the signals transmitted at said transmitting terminals and received at said receiving terminals, said control means comprising a single light source means which varies its light intensity in accordance with syllabic variations in said signals, a plurality of photo-electric cells operating responsive to the illuminating intensity of said source means, first means including at least one of said cells for compressing the signals at said transmitting terminals, and second means including at least one other of said cells for expanding the signals received at said receiving terminals.

13. A compandor circuit comprising at least one two-way terminal, at least one one-way transmitting terminal and at least one one-way receiving terminal, means for interconnecting said terminals, first amplifier means interposed between said two-way and said transmitting one-way terminal, means including a first photo-electric cell for controlling the volume of said first amplifier means, second amplifier means interposed between said receiving one-way terminal and said two-way terminal, means including a second photo-electric cell for transmitting output signals from the second amplifier to said two-way terminals, common control means for controlling the light intensity falling on said cells in accordance with syllabic variations in said signals, first means for feeding back the output of said first amplifier to said common control means for compressing the signals forwarded to said transmitting terminals, and second means for feeding forward the input to said second amplifier to said common control means for expanding the signals received at said receiving terminals.

14. A compandor circuit comprising two two-way terminals, two, one-way transmitting terminals and two, one-way receiving terminals, a hybrid network having one side connected to said two-way terminals, means interposed between the other side of said hybrid network and said one-way transmitting terminals for amplifying signals received at said two-way terminal, means comprising a voltage divider having a photo-electric cell in one arm for controlling the voltage of said signals applied to said amplifier, means interposed between the other side of said hybrid network and said one-way receiving terminals for amplifying signals received at said receiving terminals, and means comprising a second photo-electric cell for conveying signals from the second named amplifier to said hybrid network, common control means for controlling the intensity of light falling on said cells in accordance with syllabic variations in said signals.

15. A voice signal compression and expansion device comprising transmit and receive channels, means for independently amplifying signals appearing in said two channels, means comprising a pair of photo-electric cells for independently controlling the volume of said amplifying means responsive to the intensity of light falling on said cells, means responsive to the output of said transmit channel for varying the intensity of light falling on the photo-electric cell controlling the volume of the amplifying means associated with said transmit channel, and means responsive to the input of said receive channel for varying the intensity of light falling on the photo-electric cell controlling the volume of the amplifying means associated with said receive channel.

16. A telephone transmission circuit comprising at least two communication channels, one of said channels having a transmit terminal and the other of said channels having a receive terminal, first means comprising a photo-electric cell in said one channel for amplifying and applying signals to said transmit terminal, second means comprising another photo-electric cell in said other channel for amplifying and transmitting signals received at said receive terminal, means for feeding back the signals applied to said transmit terminal for controlling the volume of said first means, and means for feeding forward the signals received at said receive terminal for controlling the effective output volume of said second means, said feedback and feed forward controlling said volumes by changing the intensity of light falling on said cells.

17. A telephone transmission circuit comprising a pair of isolated communication channels, at least one transmit terminal associated with one of said channels and at least one receive terminal associated with the other said channels, means responsive to signals appearing in said one channel for amplifying and applying said signals to said transmit terminal, means comprising a lamp and photo-electric cell for varying the volume of said applied signal, means for feeding back a portion of the signal applied to said transmit terminal for varying the intensity of the light from said lamp, means responsive to signals appearing at said receive terminal for amplifying and transmitting said received signal through said other channel, means comprising another lamp and another photo-electric cell for varying the volume of signals transmitted through said other channel, and means for feeding forward a portion of said signal appearing at said receive terminal to vary the intensity of said other lamp.

References Cited by the Examiner

UNITED STATES PATENTS

| | | | |
|---|---|---|---|
| 1,843,288 | 2/32 | Leonard | 325—413 |
| 2,207,243 | 7/40 | Dimmick | 250—206 |
| 2,328,951 | 9/43 | Bryant | 333—14 |
| 2,727,683 | 12/55 | Allen et al. | 250—217 |
| 2,825,764 | 3/58 | Edwards et al. | 333—14 |
| 3,059,119 | 10/62 | Zenor | 250—208 |

HERMAN KARL SAALBACH, *Primary Examiner.*